United States Patent
Lee et al.

(10) Patent No.: US 12,500,863 B1
(45) Date of Patent: Dec. 16, 2025

(54) METHOD OF COMPLETING ADDRESS SETTING FOR MULTIPLE DEVICES OF A SERIAL COMMUNICATION SYSTEM

(71) Applicants: GENERAL LUMINAIRE CO., LTD., New Taipei (TW); GENERAL LUMINAIRE (SHANGHAI) CO., LTD., Shanghai (CN)

(72) Inventors: Chien Lee, Shanghai (CN); Yung-Hong Wang, Shanghai (CN)

( * ) Notice: Subject to any disclaimer, the term of this patent is extended or adjusted under 35 U.S.C. 154(b) by 35 days.

(21) Appl. No.: 18/789,725

(22) Filed: Jul. 31, 2024

(51) Int. Cl.
  *H04L 61/5069* (2022.01)
  *H04L 67/12* (2022.01)
  *H05B 47/175* (2020.01)

(52) U.S. Cl.
  CPC .......... *H04L 61/5069* (2022.05); *H04L 67/12* (2013.01); *H05B 47/1985* (2024.01)

(58) Field of Classification Search
  CPC .. H04L 61/5069; H04L 67/12; H05B 47/1985
  USPC ....................................................... 709/220
  See application file for complete search history.

(56) References Cited

U.S. PATENT DOCUMENTS

| | | | | |
|---|---|---|---|---|
| 2009/0085499 A1* | 4/2009 | Hsu | ........................ | H05B 47/18 |
| | | | | 315/294 |
| 2014/0062339 A1* | 3/2014 | Wiscombe | ........... | H05B 47/185 |
| | | | | 315/307 |
| 2014/0286338 A1* | 9/2014 | Kurita | ..................... | H04L 49/70 |
| | | | | 370/392 |
| 2015/0098709 A1* | 4/2015 | Breuer | ..................... | G01S 11/12 |
| | | | | 398/118 |
| 2016/0330825 A1* | 11/2016 | Recker | ................... | H05B 45/20 |
| 2017/0099572 A1* | 4/2017 | Breuer | ................. | G01S 19/485 |
| 2017/0223807 A1* | 8/2017 | Recker | ................. | H05B 47/115 |
| 2018/0084625 A1* | 3/2018 | Niebert | ................. | H05B 45/30 |
| 2018/0254835 A1* | 9/2018 | Breuer | ................. | H04B 10/116 |
| 2022/0279634 A1* | 9/2022 | Upton | ..................... | H05B 47/16 |

FOREIGN PATENT DOCUMENTS

CN        115956360 A  *  4/2023  ............ H04W 88/16

* cited by examiner

*Primary Examiner* — Tauqir Hussain

(57) ABSTRACT

In a method of automatically completing address setting for multiple devices installed on a bus of a serial communication system, a relay is connected between two adjacent electronic devices broadcast by the host in a preceding order and a succeeding order, and all electronic devices broadcast by the host, except the one broadcast by the host in the most prioritized order, are controlled by the preceding adjacent relay to control the enablement of the telecommunication connection with the host. Under this framework, the IDs of the electronic devices are automatically set in sequence in compliance with three limitation rules, namely, Rule A: the electronic device already set with an ID address will not be rewritten, Rule B: the electronic device with already configured address setting will drive the adjacent relay into a conduction state, and Rule C: the relay will not be disconnected after being conducted.

2 Claims, 3 Drawing Sheets

| During initial configuration addressing, the MCU drives all of the relays into a disconnection state, such that only the electronic device with the highest priority in the broadcast sequence is telecommunicatively connected to the host. | S1 |

| When the host sends out a communication broadcast message, the host sends out an address setting command to set the ID of the first work node to 1, and, in the first work node, only the electronic device with the first order in the broadcast sequence receives the address setting command, so that the ID of 1 is written into the electronic device with the first order in the broadcast sequence, and according to Rule B, the MCU is driven to notify that the relay adjacent to the electronic device with the ID of 1 is in the conduction state after the setting is completed. | S2 |

| The host sends out the address setting command again to set the ID of the second work node to 2, and in the second work node, only the electronic devices with the first order and the second order in the broadcast sequence receive the address setting command respectively. According to the Rule A, the electronic device with already configured ID address setting will not be rewritten, and the ID of 2 is written into the electronic device with the second order in the broadcast sequence; and according to Rule B, the MCU is driven to notify that the next relay adjacent to the electronic device with the ID of 2 is in the conduction state. | S3 |

| The host repeatedly sends out the address setting command to set the ID of a work node to 3 to N, respectively, according to the Rule A, Rule B and Rule C, and the ID of 3 to N is written into the electronic devices with the third order to the Nth order in the broadcast sequence respectively, so as to sequentially complete the addressing operation of each electronic device in the serial communication system. | S4 |

Fig. 1

METHOD OF COMPLETING ADDRESS SETTING FOR MULTIPLE DEVICES OF A SERIAL COMMUNICATION SYSTEM

BACKGROUND OF THE INVENTION

1. Field of the Invention

The present disclosure relates to a method of setting the address of electronic devices by a communication system, and more particularly relates to a method of completing the address setting for multiple devices of a serial communication system.

2. Description of the Related Art

Serial communication is a communication process of sending data one bit at a time through a computer bus or other data channels. The serial communication is commonly used in all kinds of building lighting systems, where all the lighting devices are set up on a bus line, so that every signal sent by a control host will be received by all lighting devices on the bus line. Therefore, the lighting system needs to set up a unique identifier of channel (ID) for each lighting device, in order to ensure that the signal is sent out to drive the corresponding lighting device to perform corresponding action, so that after the lighting device receives the signal sent by the control host, the identifier of channel (ID) can be used to check the corresponding signal, and then the relevant function is executed to ensure the accuracy of action. In the past, dual in-line package (DIP) switch was often used to set the ID address or channel number. However, this type of DIP switch may be inconvenient to operate for setting up an outdoor LED lighting system due to the installation height and location of the lighting device. In addition, the DIP switches generally have weak waterproof and dustproof functions, making the use of DIP switches to set the ID address of outdoor LED lamps unable to meet actual needs. When addressing this problem, it is common practice to preset a pre-determined unique identifier (UID) for each lighting device before it is sent out, so that the user can set the ID at the installation site based on the UID to improve the convenience of the operation.

When faced with the installation of a large linear lighting system or a pixel type lighting system, the traditional methods of manually setting the ID for each lamp become impractical and costly due to the interconnected nature of the lighting devices. Therefore, there is a common methods in the market for automatically setting IDs in sequence, which is to connect each lighting device to an additional third address line, and use this third address line to determine the sequence of installed lamps, and then set the ID for each lighting device through this third address line during the address setting operation. However, this method will become difficult and costly to implement as the number of lighting devices or related components increases, which does not meet the actual application requirements.

In view of these drawbacks, how to provide an automatic addressing method to overcome the above-mentioned drawbacks of the related art is the subject of the present disclosure.

SUMMARY OF THE DISCLOSURE

It is a primary objective of the present disclosure to provide a method of using a serial communication system in a lighting system to address electronic devices, and the system can achieve the function of automatically and sequentially addressing each electronic lighting device by setting up relays in the circuit and using sequential host communication broadcast technology.

To achieve the aforementioned objective, the present disclosure discloses a method of completing address setting for multiple devices of a serial communication system, the serial communication system includes a host and a bus, the host sends a broadcast message to a plurality of electronic devices on the bus through the bus, characterized in that the host sends the communication broadcast message to the electronic devices with a broadcast sequence, the quantity of electronic devices is N, a relay is installed between any two adjacent electronic devices, the quantity of relays is M, and N=M+1, and each relay is connected between two of the electronic devices broadcast by the host in a preceding order and a succeeding order, wherein the relays control disconnection or conduction through a microcontroller unit (MCU) telecommunicatively coupled to the host, and except the electronic device with the highest priority broadcast sequence of the host, all remaining other electronic devices broadcast by the host are controlled by the adjacent and preceding relay to determine whether to telecommunicatively connect with the host; and the address setting process follows three limitation rules, respectively: Rule A: the electronic device already set with an ID address will not be rewritten, Rule B: the electronic device with already configured address setting will drive the adjacent relay into a conduction state, and Rule C: the relay will not be disconnected after being conducted; during an initial configuration addressing, the MCU drives all of the relays into a disconnection state, such that the electronic device with the highest broadcast sequence is the only one that shows the conduction state of telecommunication with the host, and then the host sends out an address setting command to set the ID of a first work node to 1, and, in the first work node, only the electronic device with the first order in the broadcast sequence receives the address setting command, so that the ID of the electronic device with the first order in the broadcast sequence is set to 1, and according to Rule B, after the setting is completed, the MCU is driven to notify that the next relay adjacent to the electronic device with the ID of 1 is in the conduction state, and then the host sends out the address setting command again to set the ID of a second work node to 2, and in the second work node, only the electronic devices with the first order and the second order in the broadcast sequence receive the address setting command, and according to the Rule A, the electronic device with the completed ID address setting will not be rewritten, and the ID of 2 is written into the electronic device with the second order in the broadcast sequence, and according to Rule B, the MCU is driven to notify that the next relay adjacent to the electronic device with the ID of 2 is in the conduction state; and then the host repeatedly sends out the address setting command to set the IDs of work nodes to 3 to N, respectively, according to the Rule A, Rule B and Rule C.

Wherein, the electronic device is a lighting device.

In summation of the description above, the present disclosure sets one of the relays between two electronic devices in a system circuit and uses the MCU and each address setting command to control the working state of each relay, thereby controlling the enablement, sequence and timing of the next electronic device adjacent to the relay to receive the enablement, sequence and timing of the corresponding address setting command. Therefore, when the host sends out the broadcast message through the bus, each broadcast signal will not be received by the connected electronic devices at the same time. In other words, the enablement of receiving the address setting command by each electronic device is adjusted by the relay, and even if the serial communication system has an automatic addressing function, it can still solve the problem of the complicated addressing procedure because all of the electronic devices on the bus are affected by the communication broadcast message sent by the host at the same time point.

BRIEF DESCRIPTION OF THE DRAWINGS

FIG. 1 is a flow chart of a first preferred embodiment of the present disclosure;

DETAILED DESCRIPTION OF THE PREFERRED EMBODIMENTS

To make it easier for the examiner to understand the content of the present disclosure, the specification accompanied by the drawings is described as follows.

Figure 2:
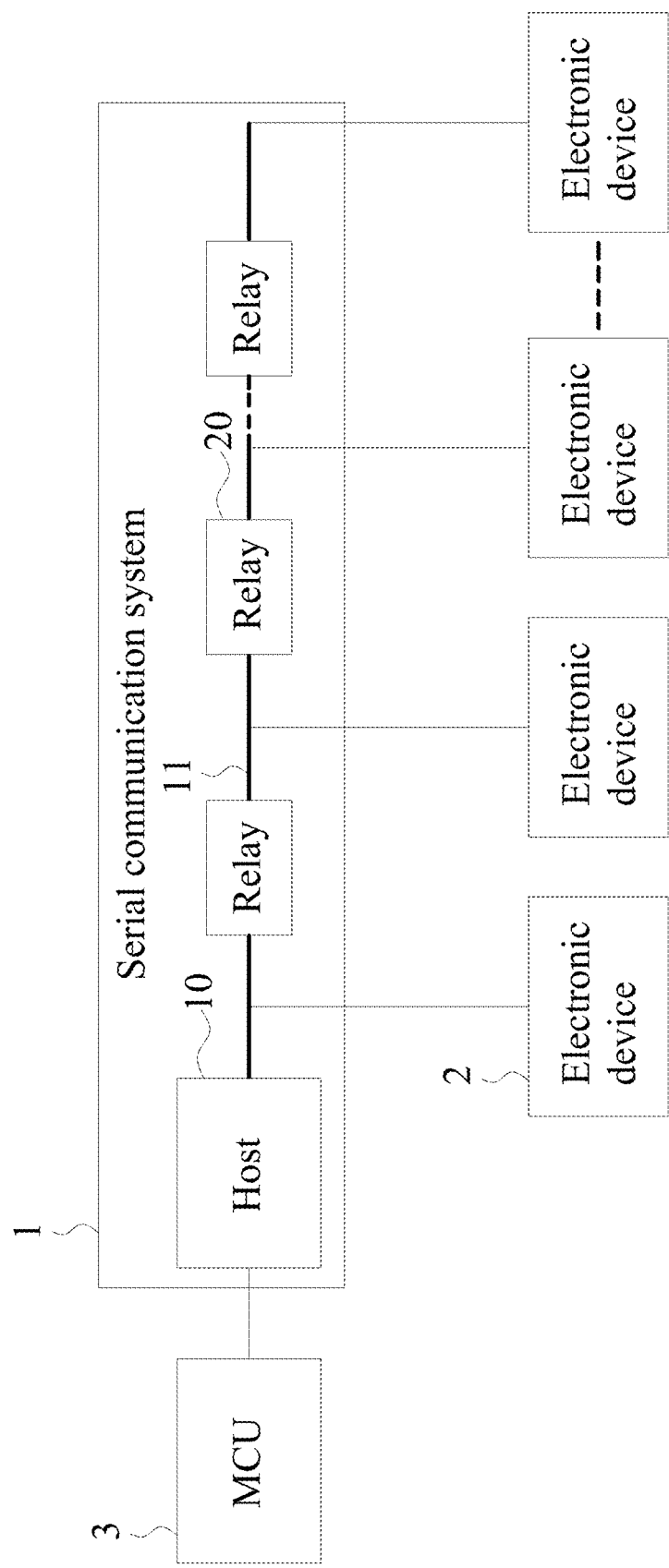
FIG. 2 is a schematic block diagram of the first preferred embodiment of the present disclosure.
Figure 3:
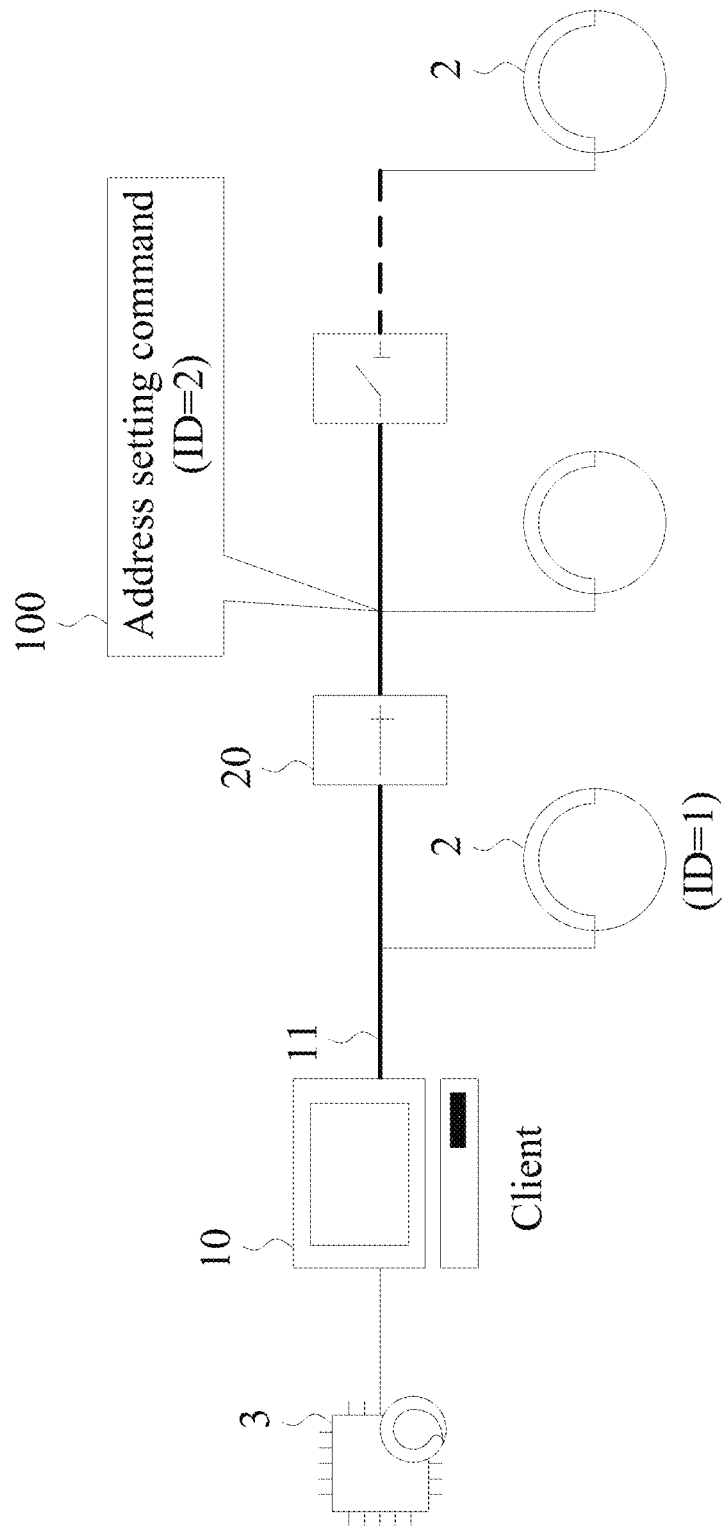
FIG. 3 is a schematic view showing the use of a second preferred embodiment of the present disclosure.

With reference to FIGS. 1 to 3 for the flow chart and schematic block diagram of the first preferred embodiment and the schematic view showing the use of the second preferred embodiment of the present disclosure respectively, the serial communication system 1 includes a host 10 and a bus 11, the host 10 is telecommunicatively connected to a MCU 3, the bus 11 is provided with a plurality of electronic devices 2 and a plurality of relays 20, and the host 10 sends a communication broadcast message to the electronic devices 2 on the bus 11 through the bus 11, wherein the host 10 sends out the communication broadcast message to the electronic devices 2 with a broadcast sequence. The quantity of electronic devices 2 is N, one of the relays 20 is provided between two adjacent electronic devices 2, the quantity of the relays 20 is M, and N=M+1, such that each relay 20 is connected between two of the electronic devices 2 broadcast by the host in a preceding order and a succeeding order respectively. The method of completing the address setting of the plurality of electronic devices 2 in the serial communication system 1 in accordance with the present disclosure follows three limitation rules, respectively: Rule A: the electronic device 2 already set with an ID address will not be rewritten, Rule B: the electronic device 2 with already configured address setting will drive the adjacent relay 20 into a conduction state; Rule C: the relay 20 will not be disconnected after being conducted, and the address setting method of the present disclosure includes the following steps S1 to S4.

S1: When the relays 20 controls the disconnection or conduction by the MCU 3 telecommunicatively connected to the host 10 and during an initial configuration addressing, the MCU 3 drives all of the relays 20 into a disconnection state, such that the electronic device 2 with the highest priority in the broadcast sequence is the only one that shows the conduction state of telecommunication with the host 10. Therefore, except the electronic device 2 that receives the communication broadcast of the host 10 with the highest priority in the broadcast sequence, the other electronic devices 2 that receive the communication broadcast of the host 10 are controlled by the preceding adjacent relay 20 to control whether to telecommunicatively connect with the host 10.

S2: When the host 10 sends out a communication broadcast message, the host sends out an address setting command 100 to set the ID of the first work node to 1, and, in the first work node, only the electronic device 2 with the first order in the broadcast sequence receives the address setting command 100, so that the ID of 1 is written into the electronic device 2 with the first order in the broadcast sequence, and according to Rule B, the MCU 3 is driven to notify that the relay 20 adjacent to the next electronic device 2 with the ID of 1 is in the conduction state, after the setting is completed.

S3: The host 10 sends out the address setting command 100 again to set the ID of the second work node to 2, and in the second work node, only the electronic devices 2 with the first order and the second order in the broadcast sequence receive the address setting command 100, respectively. According to the Rule A, the electronic device 2 with already configured ID address setting will not be rewritten, and the ID of 2 is written into the electronic device 2 with the second order in the broadcast sequence; and according to Rule B, the MCU 3 is driven to notify that the next relay 20 adjacent to the electronic device 2 with the ID of 2 is in the conduction state.

S4: the host 10 repeatedly sends out the address setting command 100 to set the ID to a work node of 3 to N according to the Rule A, Rule B and Rule C, and the ID of 3 to N is written into the electronic devices 2 with the third order to the $N^{th}$ order in the broadcast sequence, respectively, so as to sequentially complete the addressing operation of each electronic device 2 in the serial communication system 1. It is noteworthy that the electronic device 2 of a preferred embodiment can be a lighting device, and each lighting device can further set its brightness and color after addressing.

What is claimed is:

1. A method of completing address setting for multiple devices of a serial communication system, the serial communication system comprising a host and a bus, the host sending a communication broadcast message to a plurality of electronic devices on the bus, characterized in that:

sending, by the host, the communication broadcast message to the plurality of electronic devices with a broadcast sequence, a quantity of the plurality of electronic devices is N, a relay is installed between any two adjacent electronic devices, a quantity of the relays is M, and N=M+1, and each relay is connected between the two adjacent electronic devices broadcast by the host in a preceding order and a succeeding order;

wherein the relays control disconnection or conduction through a Microcontroller Unit (MCU) telecommunicatively coupled to the host, and except an electronic device with a highest priority broadcast sequence of the host, each electronic device broadcast by the host are controlled by the relay that is adjacent and preceding to the electronic device to determine whether to telecommunicatively connect with the host, and an address setting process follows three limitation rules, respectively:

Rule A: an electronic device that has been set with an Identifier of channel (ID) address will not be rewritten, Rule B: after an electronic device has completed the address setting process, an adjacent relay is driven to a conductive state, and Rule C: the driven relay will not be disconnected after being conducted, during an initial configuration addressing, the MCU drives all of the relays into a disconnection state;

wherein only the electronic device with a first order in the broadcast sequence is telecommunicatively connected to the host, and then the host sends out an address setting command to set an ID of a first work node to 1, in the first work node, only the electronic device with the first order in the broadcast sequence receives the address setting command, so that an ID of the electronic device with the first order in the broadcast sequence is set to 1, and according to Rule B, after the ID of the electronic device with the first order in the broadcast sequence is set to 1, the MCU is driven to notify that an relay adjacent to the electronic device with the ID of 1 is in the conduction state;

the host sending out the address setting command again to set an ID of a second work node to 2, and in the second work node, only the electronic device with the first order and an electronic device with a second order in the broadcast sequence receive the address setting command, and according to the Rule A, the electronic device the ID of which has been set to 1 will not be rewritten, such that an ID of the electronic device with the second order in the broadcast sequence is set to 2, and according to Rule B, the MCU is driven to notify that an relay adjacent to the electronic device with the ID of 2 is in the conduction state; and the host further repeatedly sending out the address setting command to set IDs of work nodes to 3 to N to correspondingly set an ID of other electronic devices, respectively, according to the Rule A, Rule B, and Rule C.

2. The method according to claim 1, wherein the plurality of electronic device is a lighting device.

* * * * *